United States Patent
Berejik

(10) Patent No.: US 9,503,131 B2
(45) Date of Patent: Nov. 22, 2016

(54) ANTENNA FOR RECEIVING AND/OR TRANSMITTING POLARIZED COMMUNICATION SIGNALS

(71) Applicant: MOBILE SAT LTD, Tel Aviv (IL)
(72) Inventor: Zacharia Berejik, Tel Aviv (IL)
(73) Assignee: MOBILE SAT LTD, Tel Aviv (IL)
( * ) Notice: Subject to any disclaimer, the term of this patent is extended or adjusted under 35 U.S.C. 154(b) by 0 days.

(21) Appl. No.: 14/770,844
(22) PCT Filed: Feb. 27, 2014
(86) PCT No.: PCT/IL2014/050202
§ 371 (c)(1),
(2) Date: Aug. 27, 2015
(87) PCT Pub. No.: WO2014/132257
PCT Pub. Date: Sep. 4, 2014

(65) Prior Publication Data
US 2016/0006465 A1   Jan. 7, 2016

Related U.S. Application Data

(60) Provisional application No. 61/770,439, filed on Feb. 28, 2014.

(51) Int. Cl.
*H04W 72/00* (2009.01)
*H04B 1/04* (2006.01)
(Continued)

(52) U.S. Cl.
CPC .......... *H04B 1/0475* (2013.01); *H01Q 1/3275* (2013.01); *H01Q 13/0208* (2013.01);
(Continued)

(58) Field of Classification Search
CPC ........ H01P 1/213; H01P 1/161; H01P 3/127; H04W 16/14
USPC .................. 333/137; 455/103, 137, 454, 73; 343/771
See application file for complete search history.

(56) References Cited

U.S. PATENT DOCUMENTS 5,798,829 A * 8/1998 Vaez-Iravani ...... G01N 21/9501
356/237.1
6,943,949 B2 * 9/2005 Sedlmayr ............... G02B 26/02
348/E13.014
(Continued)

FOREIGN PATENT DOCUMENTS

WO   WO 2008/114246   9/2008

OTHER PUBLICATIONS

Brown K.W et al. "A Systematic Design Procedure for Classical Offset Dual Reflector Antennas with Optimal Electrical Performance, Antennas and Propagation" Propagation Society International Symposium 1993 Digest. vol. 2. Jun. 28-Jul. 2 pp. 772-775.
(Continued)

*Primary Examiner* — Sonny Trinh
(74) *Attorney, Agent, or Firm* — Pearl Cohen Zedek Latzer Baratz LLP

(57) ABSTRACT

An antenna for communicating with a remote communication system. The antenna comprises main and sub reflectors, a beam shaping element facing the sub reflector and having a plurality of feeding points, a plurality of ortho-mode transducers (OMTs), and a plurality of waveguides each having a proximal end connected to another of the plurality of OMTs and a distal end connected to one of the plurality of feeding points. The beam shaping element is sized and shaped to form an ellipsoidal beam creating a first elliptical spot on the sub reflector by combining a plurality of polarized intermediate transmission signals; each of the polarized intermediate transmission signals is originated from another of the plurality of OMTs.

27 Claims, 12 Drawing Sheets

(51) Int. Cl.
  *H01Q 1/32* (2006.01)
  *H01Q 13/02* (2006.01)
  *H01Q 19/17* (2006.01)
  *H01Q 19/19* (2006.01)
  *H01Q 25/00* (2006.01)
  *H01Q 15/24* (2006.01)
  *H01Q 19/10* (2006.01)

(52) U.S. Cl.
  CPC .......... *H01Q13/0241* (2013.01); *H01Q 15/24* (2013.01); *H01Q 15/244* (2013.01); *H01Q 19/10* (2013.01); *H01Q 19/17* (2013.01); *H01Q 19/19* (2013.01); *H01Q 25/007* (2013.01)

(56) References Cited

U.S. PATENT DOCUMENTS

| | | | | |
|---|---|---|---|---|
| 7,002,528 | B2* | 2/2006 | Moheb | H01Q 13/0208 343/781 R |
| 7,034,771 | B2* | 4/2006 | Rao et al. | H01Q 19/17 343/781 R |
| 7,154,671 | B2* | 12/2006 | Sedlmayr | G02B 26/02 348/E13.014 |
| 7,680,516 | B2* | 3/2010 | Lovberg et al. | H04B 1/38 455/431 |
| 7,868,840 | B2* | 1/2011 | Rao et al. | H01Q 19/17 343/772 |
| 8,081,046 | B2* | 12/2011 | Mahon et al. | H01P 1/161 333/125 |
| 2006/0050004 | A1 | 3/2006 | Hsiu et al. | |
| 2006/0262021 | A1 | 11/2006 | Matsui | |
| 2008/0278397 | A1 | 11/2008 | Rao et al. | |
| 2010/0238082 | A1 | 9/2010 | Kits van Heyningen et al. | |
| 2011/0012801 | A1 | 1/2011 | Monte et al. | |

OTHER PUBLICATIONS

International Search Report for International App. No. PCT/IL2014/050202 dated Jun. 22, 2014.

* cited by examiner

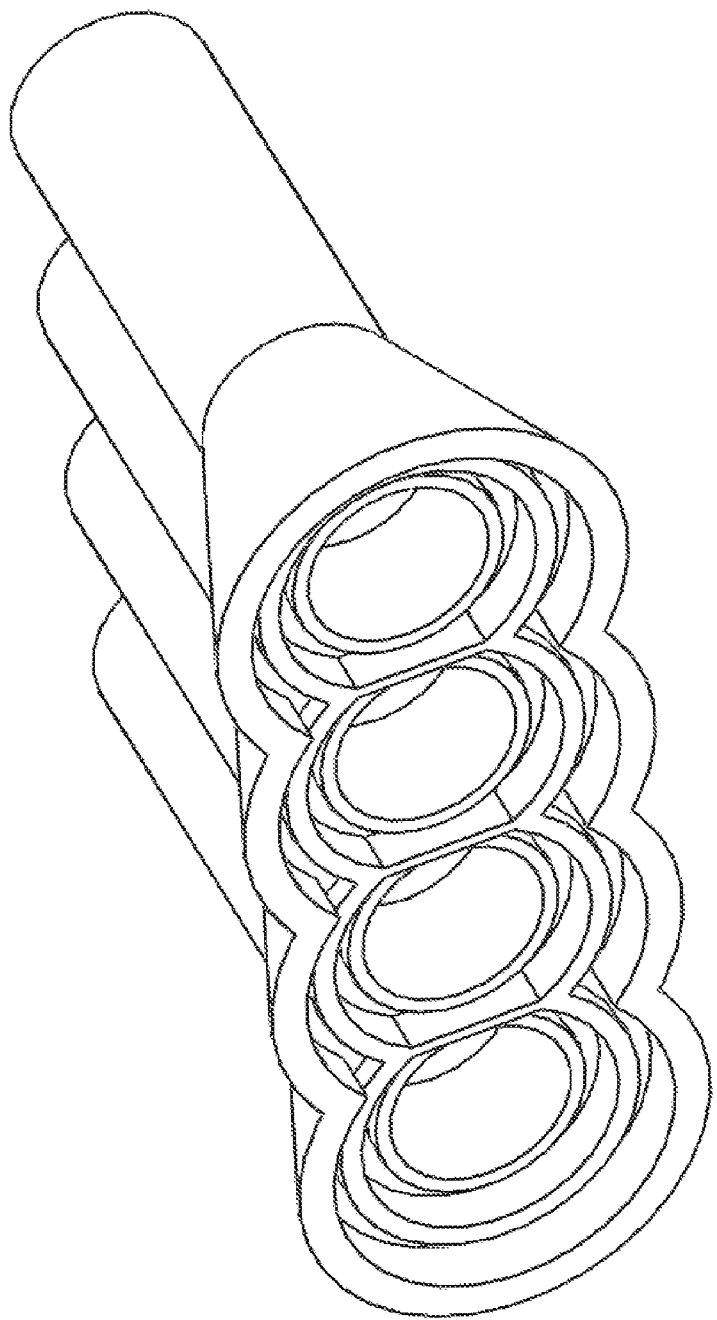

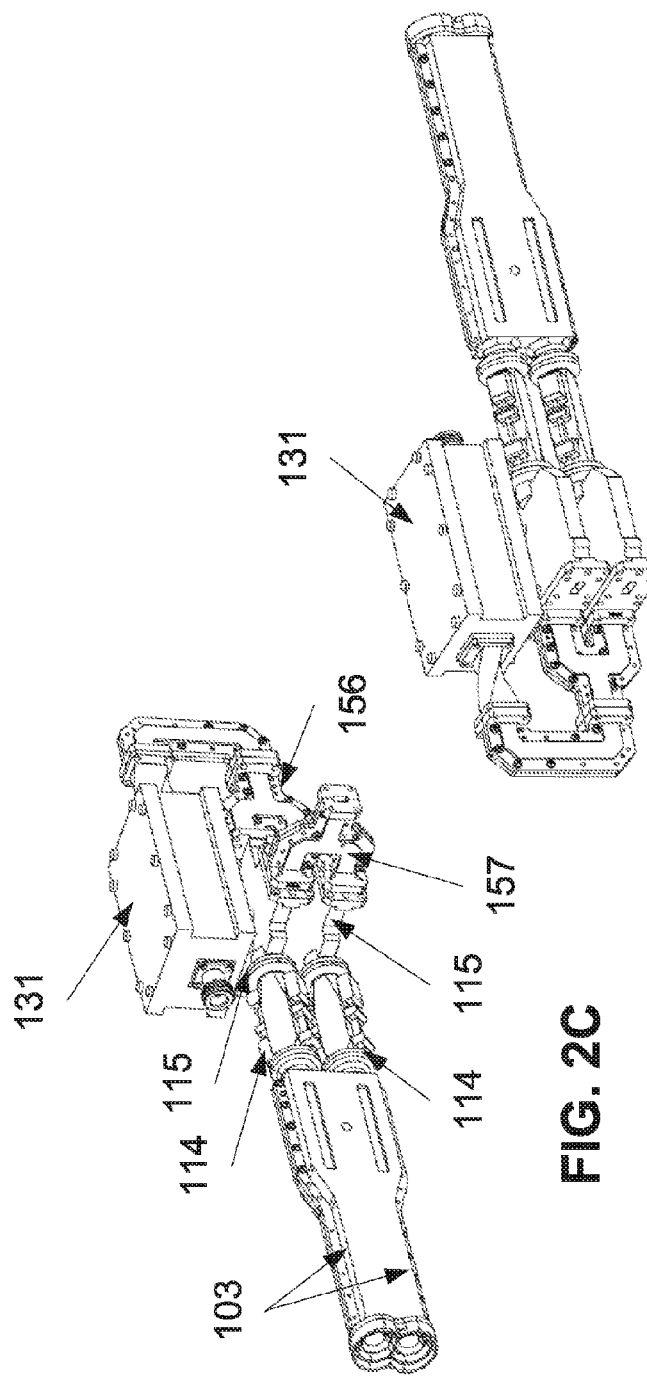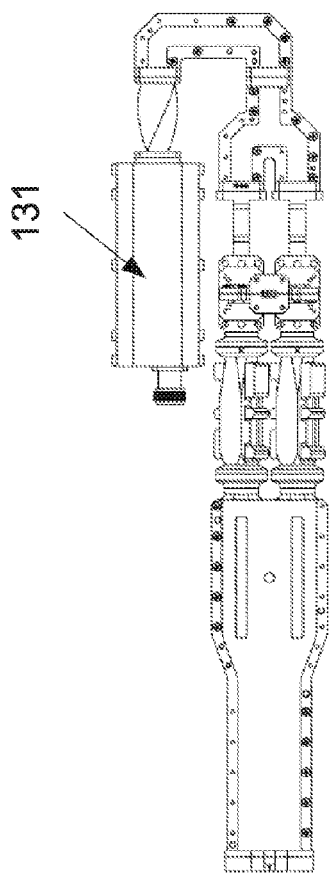

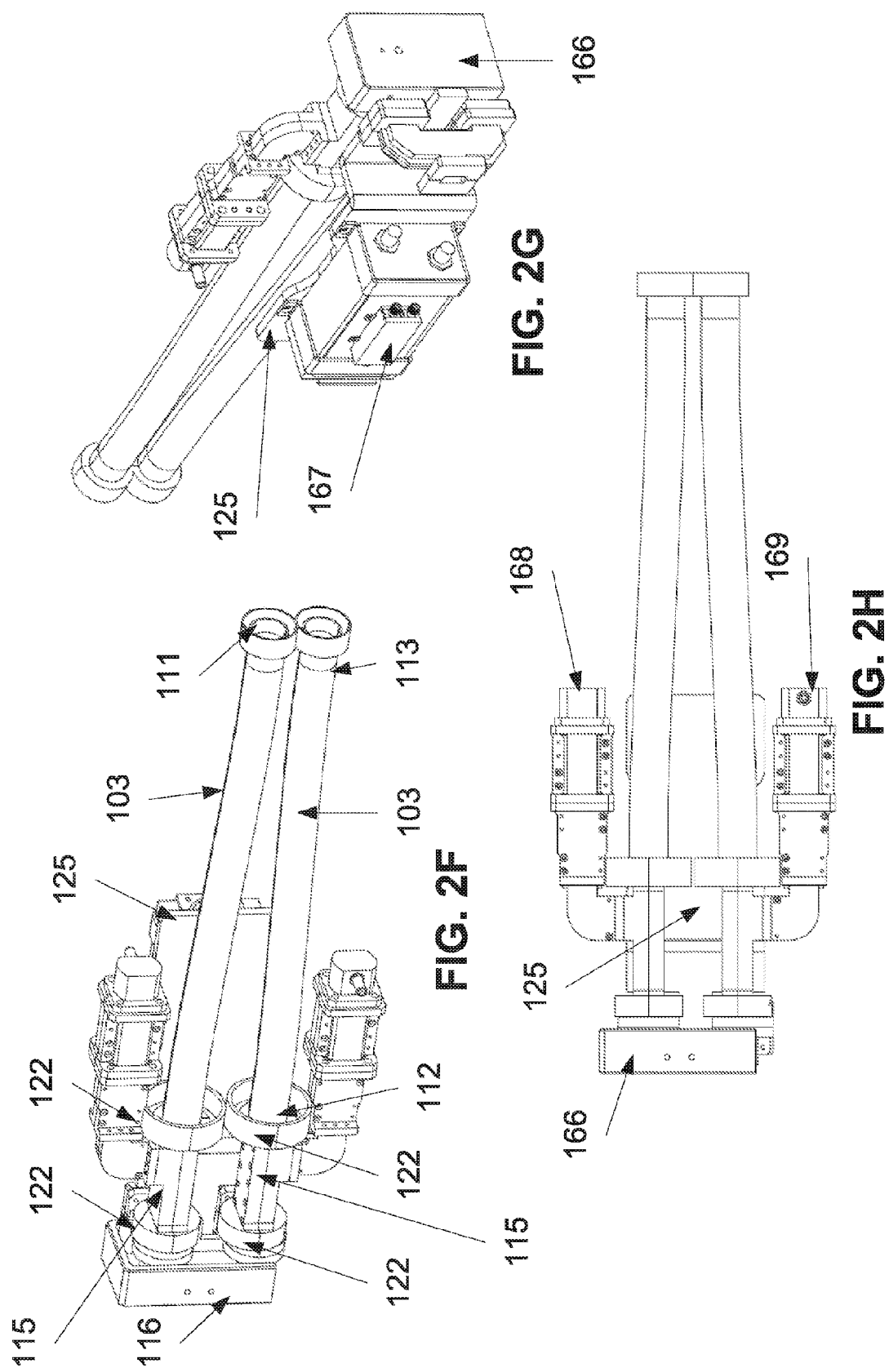

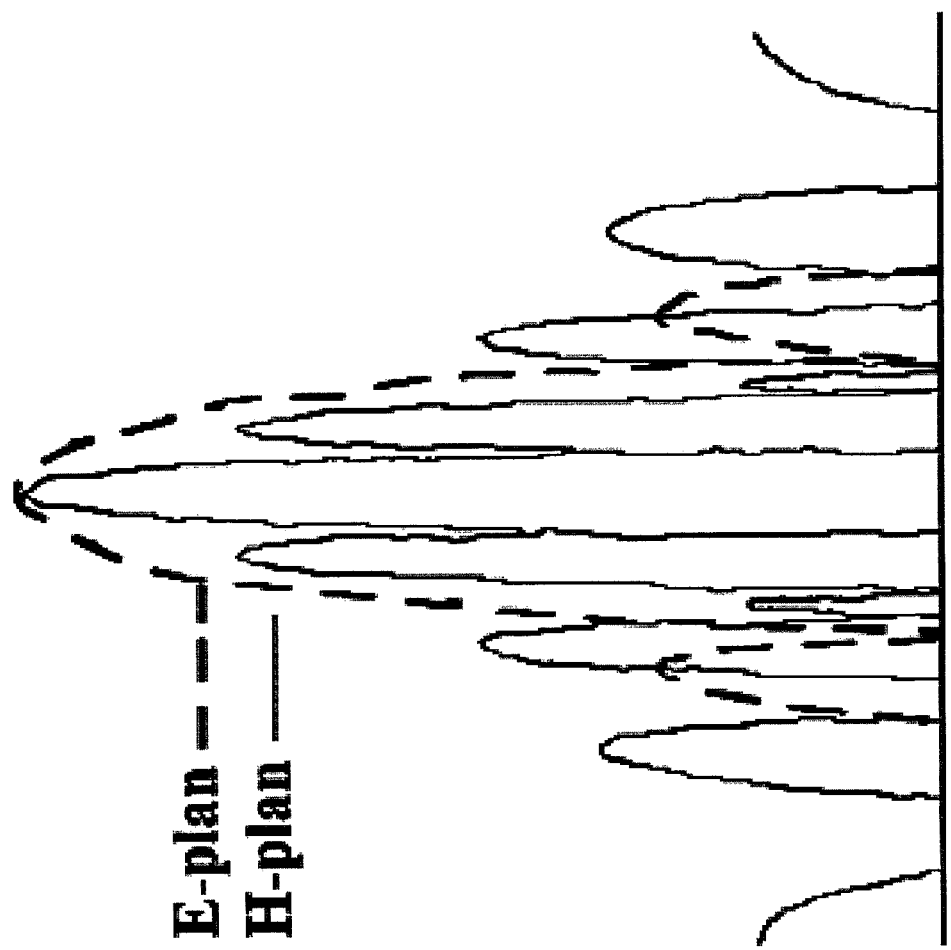

ANTENNA FOR RECEIVING AND/OR TRANSMITTING POLARIZED COMMUNICATION SIGNALS

CROSS-REFERENCE TO RELATED APPLICATIONS

This application is a National Phase Application of PCT International Application No. PCT/IL2014/050202, International Filing Date Feb. 27, 2014, claiming the benefit of U.S. Provisional Patent Application No. 61/770,439, filed Feb. 28, 2013, both which are hereby incorporated by reference.

FIELD AND BACKGROUND OF THE INVENTION

The present invention, in some embodiments thereof, relates to an apparatus and a satellite antenna and, more particularly, but not exclusively, to an apparatus and a method for vehicle-mounted antennas for satellite communication.

There is increasing interest in implementing broadband communication systems on various forms of mobile platforms, for example, maritime vessels and land vehicles. With a broadband satellite communication system that has an antenna mounted on a vehicle, the antenna is used to help form a communications link with a space-based satellite in geosynchronous orbit. The antenna forms part of a communications terminal that is carried by the vehicle.

Antennas with an ability to track, with high precision, communication satellites from mobile platforms such as aircraft, ships and land vehicles are required, inter alia, for optimizing data rate, improving the efficiency of downlink and uplink transmission, and/or preventing interference with satellites orbiting adjacent to a target satellite. Such antennas allow mobile satellite communication platforms that have relatively high attitude accelerations, such as aircraft and land vehicles to receive signals from and/or to transmit signals to satellites such as geostationary satellites.

In order to collect the signals from the remote sources and/or in order to transmit signals to thereto, it is necessary to keep the antenna pointed at the satellite while taking the movement of a vehicle into account. In order to allow the antenna to point at the satellite, the vehicle-mounted antennas are made to track side-to-side (azimuth) and up and down (elevation). However, it should be noted that in order to avoid interfering with the smooth airflow over the vehicle or adversely affecting the aesthetics of the vehicle, the profile of the vehicle-mounted antennas has to remain low.

For example, International Patent Application Pub. No. WO2008/114246, published on Sep. 25, 2008 describes an antenna for communicating with a satellite from a moving vehicle. The antenna comprises a transmitter for generating a transmission signal, main and sub reflectors, and a waveguide associated with the transmitter for conducting the transmission signal toward the sub reflector. The sub reflector is configured for redirecting the transmission signal toward the main reflector; the main reflector is configured for projecting the redirected transmission signal as an antenna beam toward the satellite.

SUMMARY OF THE INVENTION

According to some embodiments of the present invention, there is provided an antenna for communicating with a remote communication system using circularly polarized transmission signals. The antenna comprises main and sub reflectors, a beam shaping element facing the sub reflector and having a plurality of feeding points, a plurality of ortho-mode transducers (OMTs), a plurality of linear to circular polarizing elements each separately connected to one of the plurality of OMTs, and a plurality of waveguides each having a proximal end connected to another of the plurality of linear to circular polarizing elements and a distal end connected to one of the plurality of feeding points. The beam shaping element is sized and shaped to form an ellipsoidal beam creating a first elliptical spot on the sub reflector by combining a plurality of circularly polarized intermediate transmission signals, each circularly polarized intermediate transmission signal being originated from another of the plurality of waveguides and having a polarization converted by another of the plurality of linear to circular polarizing elements. Optionally, the combined signal is a KA band signal.

Optionally, a ratio of magnitudes of an axis defined by electric field vectors of the ellipsoidal beam and the circularly polarized intermediate transmission signals is at least than 1:3, for instance about 1:1.

Optionally, the antenna further comprises a transmitter which generates radiation energy from which the plurality of circularly polarized intermediate transmission signals are originated, the transmitter is located behind the main reflector.

According to some embodiments of the present invention, there is provided an antenna for communicating with a remote communication system using linearly polarized transmission signals. The antenna comprises main and sub reflectors, a beam shaping element facing the sub reflector and having a plurality of feeding points, a plurality of ortho-mode transducers (OMTs), and a plurality of waveguides each having a proximal end connected to another of the plurality of the OMTs and a distal end connected to one of the plurality of feeding points. The beam shaping element is sized and shaped to form an ellipsoidal beam creating a first elliptical spot on the sub reflector by combining a plurality of linearly intermediate transmission signals, each linearly polarized intermediate transmission signal being originated from another of the plurality of waveguides and having a polarization by another of the plurality of OMTs. Optionally, the combined signal is a KU band signal.

Optionally, the beam shaping element comprises a common feed horn.

Optionally, the beam shaping element comprises a plurality of separate feed horns.

Optionally, the beam shaping element having a beam shaping portion with a wavy contour that encircles the plurality of feeding points.

More optionally, the wavy contour is circular and continuous.

Optionally, the antenna is a vehicle mounted antenna.

Optionally, the ellipsoidal beam having a width length ratio of at least 2.5:1.

Optionally, the plurality of waveguides are mounted to traverse the main reflector in a niche located in a lower portion of the main reflector.

Optionally, the plurality of waveguides are mounted one on top of on another above a common axis which is perpendicular to the main reflector.

Optionally, the antenna further comprises a splitting element which receives a base signal generated by a transmitter and outputs the plurality of signals to the plurality of OMTs.

Optionally, the antenna further comprises a combining element having an output which is connected to a receiver and a plurality of inputs each separately connected to another of the plurality of OMTs.

More optionally, the combining element receives a plurality of intermediate reception signals from the plurality of OMTs, combines them to a single reception communication signal, and forward the single reception signal to the receiver.

Optionally, the antenna further comprises a splitting element having an input which is connected to a transmitter and a plurality of outputs each separately connected to another of the plurality of OMTs.

Optionally, at least one of the plurality of waveguides having a bended passage with a bended angle of at least 5 degrees in relation to a central axis of a respective the waveguide.

Optionally, the plurality of circularly polarized intermediate transmission signals have a common circular polarization and a common phase.

Optionally, the beam shaping element comprises a plurality of partly conical structures having a common base that forms a common contour.

According to some embodiments of the present invention, there is provided a method of transmitting a signal to a remote communication system as an ellipsoidal beam. The method comprises splitting a transmission energy to a plurality of transmission signals, separately converting a linear polarization of each transmission signal to a circular polarization to form a plurality of circularly polarized transmission signals, separately conducting each circularly polarized transmission signal in one of a plurality of waveguides, combining the circularly polarized transmission signals so as to generate an ellipsoidal beam, and directing the ellipsoidal beam as an ellipsoidal antenna beam toward the remote communication system.

Optionally, a first ratio axial ratio defined by first electric field vectors of the ellipsoidal beam and a second ratio axial defined by second electric field vectors of the plurality of circularly polarized intermediate transmission signals is at least 1:3, for example about 1:1.

According to some embodiments of the present invention, there is provided a method of transmitting a linearly polarized signal to a remote communication system as an ellipsoidal beam. The method comprises splitting a transmission energy to a plurality of transmission signals, separately linearly polarizing each transmission signal to form a plurality of polarized transmission signals, separately conducting each linearly polarized transmission signal in one of a plurality of waveguides, combining the linearly polarized transmission signals so as to generate an ellipsoidal beam, and directing the ellipsoidal beam as an ellipsoidal antenna beam toward the remote communication system.

Optionally, the combining is performed by a common feed horn to which the plurality of waveguides are mechanically connected.

Optionally, the directing comprises radiating a first elliptical spot on a sub reflector and redirecting the ellipsoidal beam toward a main reflector so as to create a second elliptical spot on the main reflector.

More optionally, the first elliptical spot having a width-height ratio of at least 2.5:1.

More optionally, the second elliptical spot having a width-height ratio of at least 3.5:1.

According to some embodiments of the present invention, there is provided an antenna for communicating with a remote communication system from a moving vehicle. The antenna comprises main and sub reflectors, a plurality of waveguides each separately connected to receive from a separate polarizing element a separate signal from a plurality of polarized signals, the a beam shaping element having a plurality of feeding points each connected to another of the plurality of waveguides, the beam shaping element having a beam shaping segment which is sized and shaped to radiate simultaneously the plurality of polarized signals so as to form an ellipsoidal beam creating a first elliptical spot on the sub reflector. The sub reflector placed to redirect the ellipsoidal beam toward the main reflector so as to create a second elliptical spot thereon.

According to some embodiments of the present invention, there is provided a method of receiving a signal from a remote communication system. The method comprises conducting a plurality of intermediate communication signals each via one of a plurality of waveguides of an antenna, the plurality of intermediate communication signals are reflected into the plurality of waveguides via a reflector of the antenna, separately converting a circular polarization of each intermediate communication signal to a linear polarization, separating from each intermediate communication signal in the linear polarization at least one of a vertically polarized signal and a horizontally polarized signal to create a group of a plurality of linearly polarized signals which are aligned parallel to each other, and forwarding an outcome of a sum of members of the group to a receiver.

According to some embodiments of the present invention, there is provided a beam shaping element for combining a plurality of polarized signals to an elliptical beam. The beam shaping element comprises a plurality of feeding points, such as apertures, each set to be connected to another of a plurality of waveguides and a signal shaping element having a wavy contour for shaping a plurality of communication signals emitted from the plurality of feeding points, such as apertures, to an elliptical beam.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data.

Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced. In the drawings:

FIG. 2B is a schematic illustration of an exemplary feed horn, according to some embodiments of the present invention;

FIG. 2C-2E are schematic illustrations of the exemplary transmission and/or reception arrangement depicted in FIG. 1A from different points of view, according to some embodiments of the present invention;

FIG. 2F-2H are schematic illustrations of the exemplary transmission and/or reception arrangement depicted in FIG. 1B from different points of view, according to some embodiments of the present invention;

FIG. 3 are horizontal radiation pattern plotted as a function of azimuth in Cartesian coordinates and a vertical radiation pattern plotted as a function of elevation in Cartesian coordinates, according to some embodiments of the present invention;

DESCRIPTION OF EMBODIMENTS OF THE INVENTION

Figure 1A:
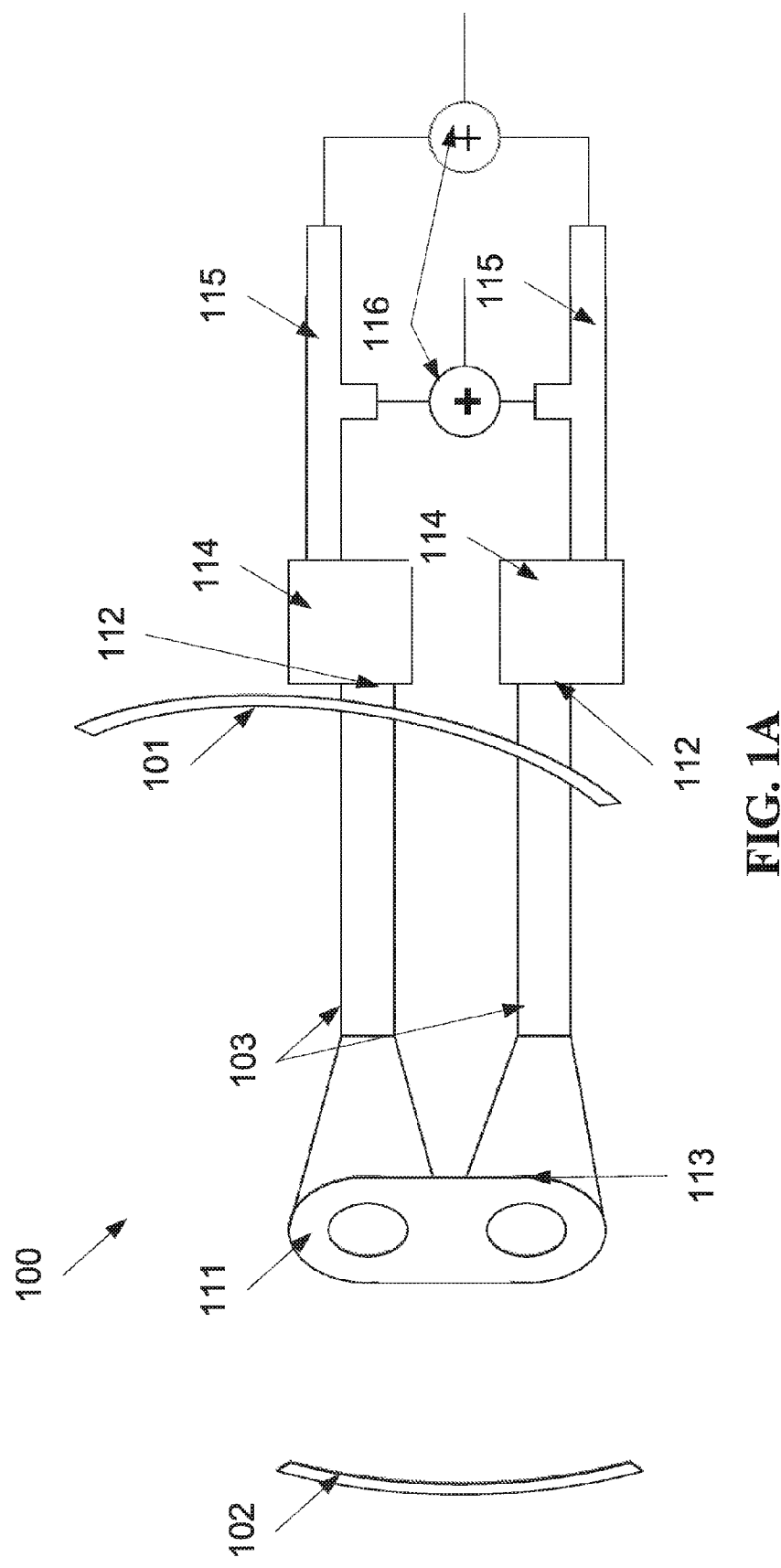
FIG. 1A is a schematic illustration of an antenna for communicating with a remote communication system, such as a satellite (not shown), by transmitting a circularly polarized elliptical beam using an array of multiple waveguides, according to some embodiments of the present invention.

The present invention, in some embodiments thereof, relates to an apparatus and a satellite antenna and, more particularly, but not exclusively, to an apparatus and a method for vehicle-mounted antennas for satellite communication.

According to some embodiments of the present invention, there are provided methods and antennas of forming a plurality of circularly or linearly polarized communication signals which are conducted in waveguides to be combined to an elliptical beam reflected toward a remote communication system, such as a satellite. The combination allows forming an elliptical beam having electric field vectors that define an axial ratio of about 1:1, similar or identical to the axial ratio of the circularly polarized communication signals. Optionally, the polarized communication signals are formed from communication signals which are conducted in a plurality of parallel transmission paths wherein a polarization of each one of them is performed separately. Then, the polarized communication signals are combined to form the elliptical beam that is directed toward the remote communication system.

The methods and antennas are optionally also used for reception, conducting a plurality of polarized communication signals which are reflected from antenna reflector(s) in waveguides for polarization and for signal separation forming a set of polarized signals which are aligned in parallel to one another. This set is summed up and forwarded to the receiver of the antenna.

According to some embodiments of the present invention, there are provided methods and antennas having a plurality of reception paths wherein a polarization of each of a plurality of intermediate communication signals is converted separately to create polarized signals. The polarized signals are separated to create a group of polarized signals which are aligned in parallel to one another. The signals in this group are combined to form a reception signal that is forwarded to a receiver.

According to some embodiments of the present invention, the antenna includes main and sub reflectors and a beam shaping element, such as a feed horn, facing the sub reflector. The beam shaping element includes a plurality of feed horns, each connected to another waveguide. Optionally, when the signals are circularly polarized, for example at the KA band, each waveguide is also connected to a linear to circular polarizing element that is also connected to an ortho-mode transducer (OMT). In use, a plurality of intermediate reception communication signals are separately conducted, each via a waveguide to a polarization conversion element and from the polarization conversion element to an OMT that extracts a linearly polarized signal. In such a manner, linearly polarized signals which are aligned parallel to one another are summed without any additional conversion. Alternatively, when the signals are linearly polarized, for example at the KU band, each waveguide is directly connected to another rotating OMT. In use, a plurality of intermediate reception communication signals are separately conducted each via a waveguide to another OMT and from the OMT to a summarizing element that extracts a linearly polarized signal.

According to some embodiments of the present invention, there is provided a beam shaping element, such as a feed horn, for combining a plurality of circularly or linearly polarized signals to an elliptical beam that is redirected to a remote communication system. The beam shaping element includes a plurality of feeding points, such as apertures, each set to be connected to another waveguide. The beam shaping element is optionally corrugated, for example includes a set of conical structures each comprises a plurality of concentric circles and partial concentric circles which for a uniform wavy contour(s) along the beam shaping element.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 1B:
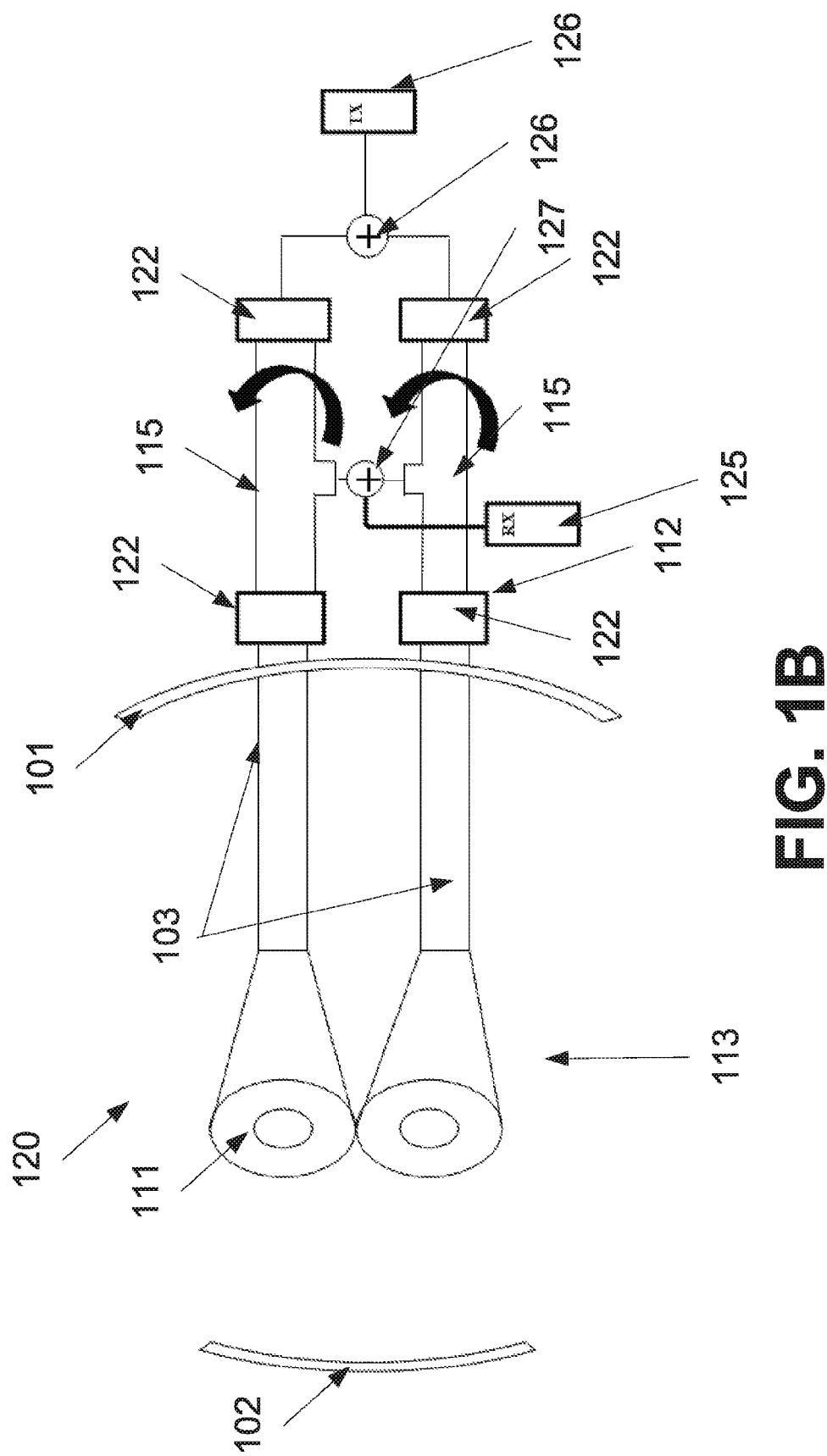
FIG. 1B is a schematic illustration of an antenna for communicating with a remote communication system, such as a satellite (not shown), by transmitting a linearly polarized elliptical beam using an array of multiple waveguides, according to some embodiments of the present invention.

Reference is now made to FIGS. 1A and 1B, which are schematic illustrations of an antenna 100 120, optionally vehicle mounted, for communicating with a remote communication system, such as a satellite (not shown), by transmitting an elliptical beam, for example in a width length ratio of at least about 2:1, for example between 1.3:1 and 5.0:1 using an array of multiple waveguides 103, according to some embodiments of the present invention. While antenna 100 is set for transmitting and receiving circularly polarized signals, for instance in the KA band antenna 120 is set for transmitting and receiving linearly polarized signals, for instance in the KU band.

Antenna 100, as antenna 120, is optionally a dual reflector antenna that comprises a main reflector 101 and a sub reflector 102 which are facing one another. Each one of the reflectors 101, 102 has a reflective surface profile, optionally substantially elliptical. The antenna 100, 120 further comprises a transmission and/or receiving unit (not shown) for generating a communication transmission signal that is later split to a plurality of interim transmission communication signals which are conducted to be transmitted as an elliptical beam via the array of multiple waveguides 103. Additionally or alternatively, the antenna 100, 120 is set for intercepting a communication reception signal by summing a plurality of interim reception signals which are received in parallel via the array of multiple waveguides 103. As used herein, a transmission and/or reception communication signal is, a remote communication system signal that is transmitted and/or received by a transmission and/or receiving unit that includes a radio frequency (RF) transmitter and/or an RF receiver and/or an RF transceiver. For clarity, the reflective surface profiles of the sub and main reflector 101, 102 are shaped in a process, such as a geometrical optics (GO) process of (geometrical optics) and/or a physical optics (PO) process for shaping reflective surfaces for antennas, see Brown, K. W. et al, a systematic design procedure for classical offset dual reflector antennas with optimal electrical performance, Antennas and Propagation Society International Symposium, 1993. AP-S. Digest Volume, Issue, 28 Jun.-2 Jul. 1993 Page(s): 772-775 vol. 2, which is incorporated herein by reference.

Optionally, the transmission communication signals are transmitted, using the sub and main reflectors 102, 101 with the reflective surface profiles which are described below, with a gain of more than 15 decibel isotropic (dBi) at 14 GHz or more than 10 dBi at 11 GHz.

Figure 2A:
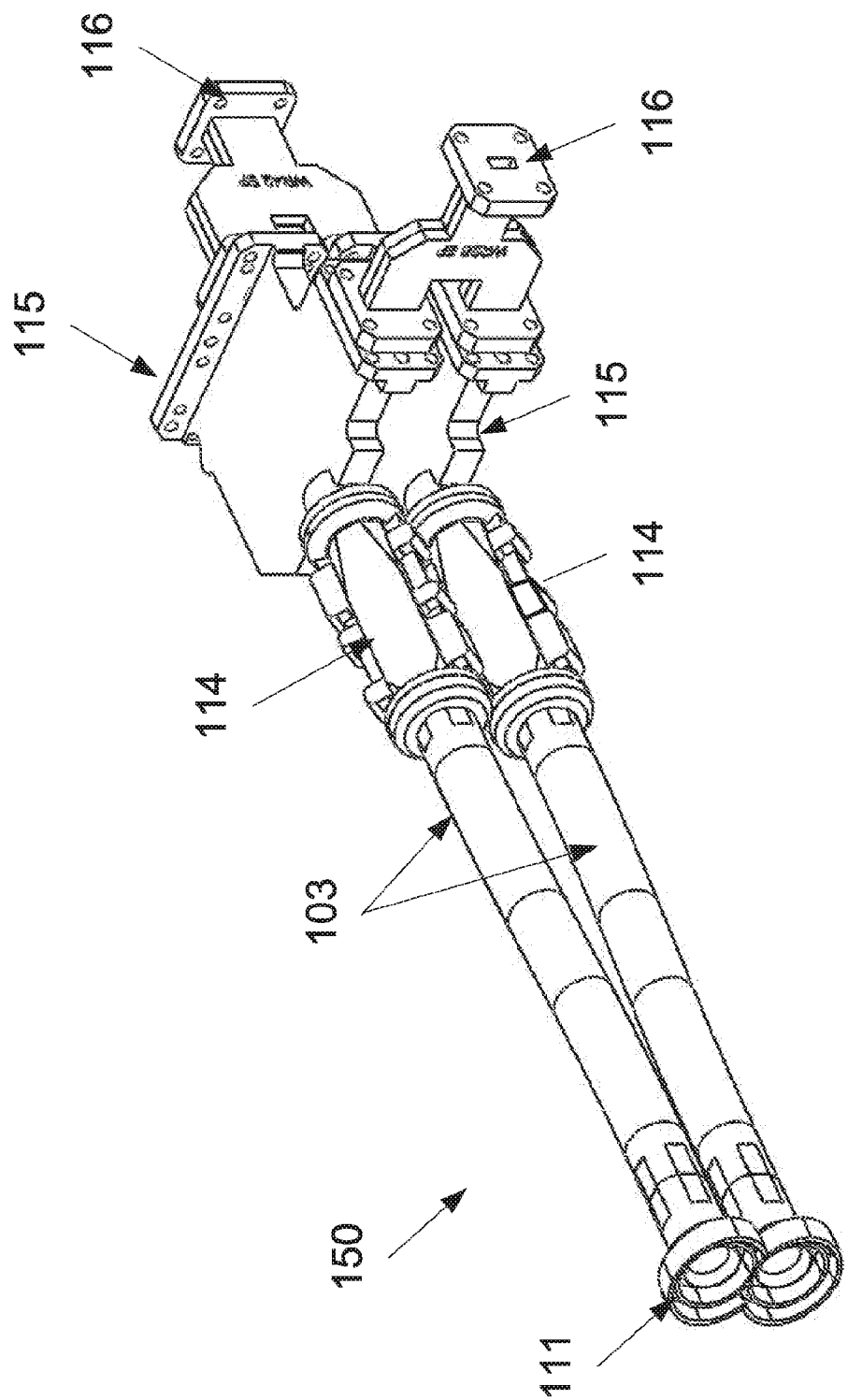
FIG. 2A is a schematic illustration of an exemplary transmission and/or reception arrangement that includes an array of multiple waveguides which is designed to be used as part of an antenna, such as depicted in FIG. 1A, according to some embodiments of the present invention.

As described above, the antenna 100, 120 comprise an array of multiple waveguides 103, for example 2, 3, 4, 5, 10 or any intermediate or larger number of waveguides. An exemplary transmission and/or reception arrangement 150 that includes an array of multiple waveguides 103 which is designed to be used as part of an antenna, such as 100, 120 is depicted in FIG. 2A to which reference is now also made. As further described below, when antenna 100 is used, each waveguide 103 is part of a different transmission and/or reception path that includes the waveguide 103 itself that is separately connected to a circular polarization element 114 that is separately connected an OMT, which is directly connected to summing/splitting element(s) 116 and to a feed from which it receives transmission signals in linear polarization (not shown). When antenna 120 is used, each waveguide 103 is part of a different transmission and/or reception path that includes the waveguide 103 itself that is connected to front joint 122 that is separately connected an OMT 115, which is directly connected to a back joint 122 that is separately to splitting element(s) 126 and to a feed from which it receives transmission signals in linear polarization (not shown). The joints 122 allow rotating the OMT for linear polarization.

In antenna 120, the OMT is a rotating OMT that includes a polarization element and may be referred to herein as a rotating OMT/polarizer assembly. The rotating OMT/polarizer assembly supports linear polarizations at a Ku band. The polarization is optionally adjusted by a rotation of the rotating OMT/polarizer assembly. The rotating OMT optionally rotates while the waveguide which is connected thereto remains stable in relation to the base of the antenna. Furthermore, the polarization adjustment may be done while the vehicle mounted antenna 120 is on a move.

Optionally, a polarization motor drive (not shown) for transferring mechanical power to the rotating OMT 401 in order to rotate it along a certain rotating angle, optionally approximately 180 degrees. The rotating is determined by an encoder which is designed to provide close loop control over the polarization to improve the communication with the communicating system by increasing the precision of the receiving and/or transmitting process. The encoder is optionally an optical encoder, such as the HEDS-5500/5540, HEDS-5600/5640, and HEDM-5500/5600 of AVAGO Technologies™, which the specification thereof is incorporated herein by reference.

The waveguides 103 are optionally circular waveguides, for example having an inner diameter of about 10 millimeter (mm), for example between about 6 mm and about 30 mm. As depicted in FIG. 2A, the waveguides 103 are optionally waveguides 103 having a bended passage. The bended passage allows connecting the distal ends of the waveguides to a beam shaping element 111, for example a common feed horn or a plurality of adjacent feed horn. The bending angle of each bended passage is optionally identical or substantially identical, for example with a deviation of about 1%, 3%, 10% and/or any intermediate or lower number. The bending angle of each bended passage is optionally of 5 or more degrees in relation to the central axis of the waveguide, for example in 5, 5.5, 6, 7, 8, 9, 10, 11, and 12 degrees. Optionally, the bended passage is formed by a number of sub waveguides which are connected to create the bended passage in a desired angle, for example 2, 5 and 10 sub waveguides or any intermediate or larger number of sub waveguides. The bended passages are optionally set to avoid undesired signal expansion. Optionally, the waveguides 103 are positioned one on top of the other, optionally to traverse the lower portion of the main reflector 101, for instance in a niche formed therein. The lower are the waveguides 103 the less they absorb and/or redirect communication signals which are redirected from the sub reflector 102 and therefore the less they reduce the effective reflective surface profile of the main reflector 101. The intermediate communication signals which are conducted in all the waveguides 103 optionally have a common circular or linear polarization and a common phase.

In use, when transmission is performed, the sub reflector 102 redirects radiation emitted from the beam shaping element 111 toward the main reflector 101 that projects the radiation as an antenna beam toward the remote communication system, which is optionally a remote communication system, for example a geostationary remote communication system (GEO remote communication system). In use, when reception is performed, the main reflector 101 redirects the radiation toward the sub reflector 102 that projects the radiation toward the beam shaping element.

Figure 4:
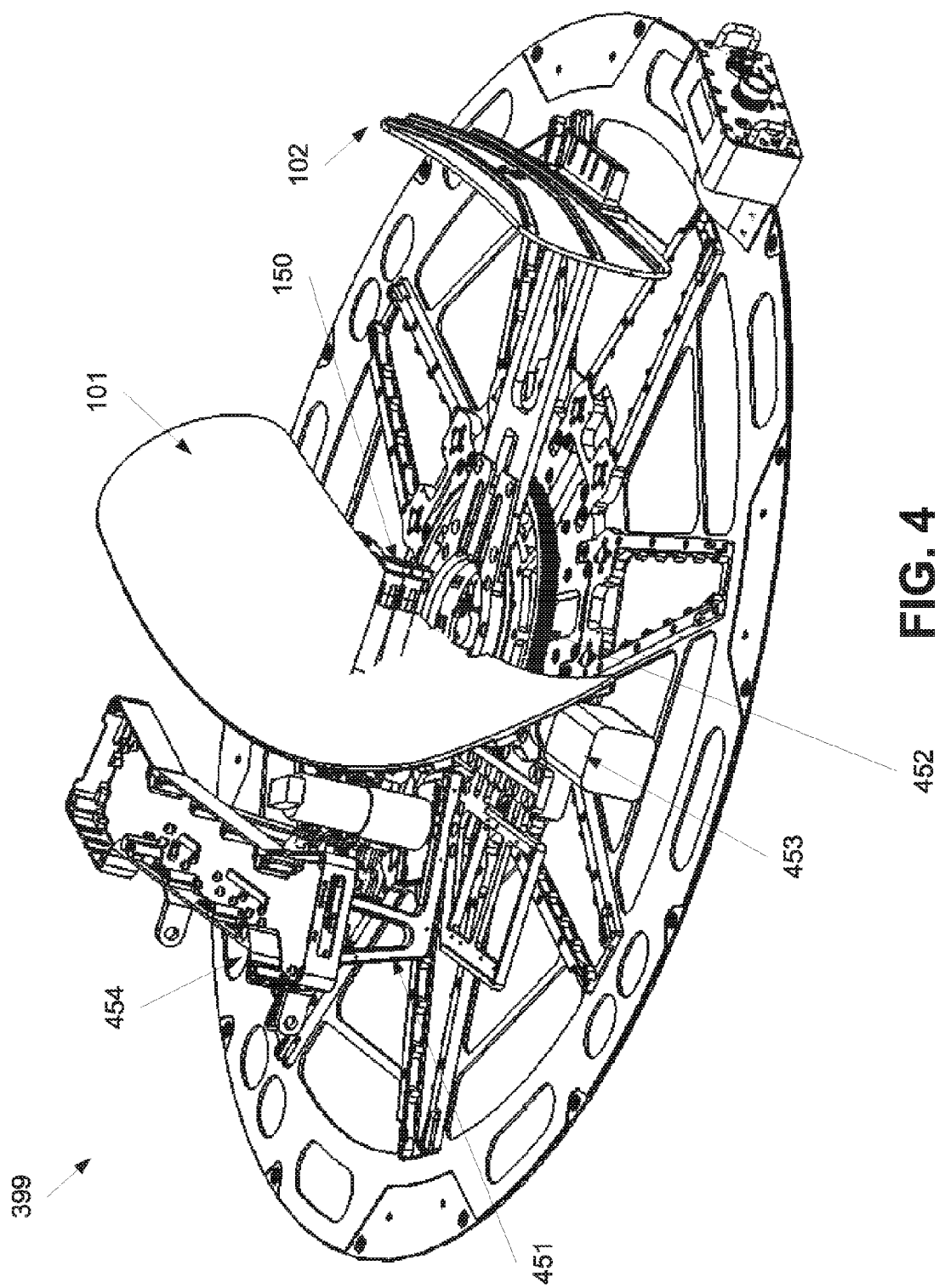
FIG. 4 is a schematic illustration of an antenna having main and sub reflectors and the transmission and/or reception arrangement depicted in FIG. 3, according to some embodiments of the present invention.

Each waveguide 103 has distal and proximal ends 112, 113. The distal ends 113 of all the waveguides 103 are optionally connected to a common beam shaping element, for example feed horn 111, for example a corrugated feed horn, which is sized and shaped to form a common elliptical beam by combining a plurality of intermediate transmission signals which are conducted simultaneously via the waveguides 103. The common beam shaping element 111 may be a set of coordinated feed horns which function together as a single beam shaping element that shapes an elliptical beam from a plurality of circularly or linearly polarized transmission communication signals while substantially maintaining the axial ratio of the transmission communication signals in the beam. For example, the common beam shaping element 111 includes a plurality of conical arrangements each having a plurality of concentric circles and optionally partial concentric circles. The center of each conical arrangement is optionally the central longitudinal axis of one of the waveguides 103. A partial concentric circle of one conical arrangement is optionally connected to one or more partial concentric circle(s) of one or more other conical arrangements, forming a uniform wavy contour, for example eight shaped uniform wavy contour when two waveguides are used, for instance as shown at FIG. 2A. It should be noted that the beam shaping element 111 is optionally adapted according to the number of used waveguides. For example, FIG. 4 depicts a feed horn with 4 feeding points. The feedhorn is sized and shaped to form an elliptical beam from the polarized intermediate communication signals which are conducted via the 4 feeding points. The common feed horn 111 forms a uniform main lobe with minimal side lobes. For example, the dashed line in FIG. 3 depicts a horizontal radiation pattern plotted as a function of azimuth in Cartesian coordinates. The horizontal radiation pattern includes a main lobe and two side lobes of a beam emitted from a common feed horn having merged circles pattern to which two waveguides are connected, for example as shown in FIG. 3. In addition, the straight line in FIG. 3 depicts a vertical radiation pattern plotted as a function of elevation in Cartesian coordinates. The vertical radiation pattern includes a main lobe and a number of side lobes of a beam emitted from a common feed horn having merged circles pattern to which two waveguides are connected, for example as shown in FIG. 3.

As outlined above, each proximal end 112 is optionally associated with another OMT. Optionally, when antenna 100 is used for transmitting and receiving circularly polarized signals, linear to circular polarization element and/or path 114 is mechanically connected between each proximal end 112 and an OMT 115. The linear to circular polarization element and/or path 114, for brevity referred to herein as linear to circular polarization element 114, supports linear to circular polarization conversion (for transmission signals) and circular to linear polarization conversion (for reception signals), optionally from both directions. Optionally, the linear to circular polarization element 114 converts an intermediate reception signal with a circular polarization to intermediate reception signal with linear polarization and an intermediate transmission signal with a linear polarization is converted to an intermediate transmission signal with a circular polarization. The waveguides 103 may be connected to an element having a plurality of separate linear to circular polarization paths 114 where each waveguide is part of a different reception and/or transmission path. An exemplary linear to circular polarization element is Patriot E0805A, which the specification thereof is incorporated herein by reference. Alternatively, when antenna 120 is used for transmitting and receiving linearly polarized signals the OMT 115 is connected via joints 122 that allows the rotation thereof of linear polarization, optionally around a longitudinal rotation axis.

In such embodiment, the antenna 100 has a number of intermediate transmission/reception signal paths wherein a plurality of transmission signals which are later combined into an elliptical beam and/or a plurality of reception signals which are later combined to be analyzed a communication reception signal are conducted simultaneously.

As outlined above, each intermediate transmission/reception signal is conducted via another OMT 115. The OMT 115 separates an intermediate reception communication signal to two orthogonal RF signals and/or conducts an RF signal, for example an interim transmission signal as further described below. Each OMT 115 may be implemented as a signal separating part in a single element that further includes a polarization conversion part that functions as a linear to circular polarization element 114, for example according to antenna 100 architecture. As described above, the OMT 115 may be a rotating OMT/polarizer assembly. For instance, in FIG. 1B each OMT 115 is a rotating OMT/polarizer assembly that conducts a reception communication signal to a receiver 125 while conducting orthogonal RF transmission signal from a transmitter 126 to one of the waveguides 103. The rotation of the OMT/polarizer assemblies in FIG. 1B is synchronized. Optionally, when two rotating OMT/polarizer assemblies 115 are used, the polarization motor drive (not shown) rotates them together, for instance 180° to one another to facilitate the sum of the signals in each channel.

Optionally, the antenna 100,120 further comprises a pedestal for attaching it to a vehicle (not shown), such as a train, an automobile, a track, a bus, a boat, a ship, a plane, a helicopter, a hovercraft, a shuttle, and any other conveyance that transports people and/or objects. For example, FIG. 4 is a schematic illustration of an antenna 399 having the above described main and sub reflectors 101, 102 and the transmission and/or reception arrangement 150, according to some embodiments of the present invention. The transmission and/or reception arrangement 150 is mounted on a support 451 that is mechanically connected to a pedestal having a rotational base 452, for example a rotational base 452 as described in International Patent Application Pub. No. WO2008/114246, published on Sep. 25, 2008, which is incorporated herein by reference. Optionally, the main reflector 101 is connected to one or more supporting elements 453 that allows the tilting thereof around a tilting axis that is parallel to the rotational base 452, for example as shown in FIG. 4 and described in International Patent Application Pub. No. WO2008/114246, published on Sep. 25, 2008, which is incorporated herein by reference.

Furthermore, as further described above, the main reflector 101 is designed to be tilted in order to allow the adjusting of the elevation angle of the main lobe of the antenna beam. The tilting is optionally performed while maintaining the waveguides 103 and the sub reflector 102 in place in relation to the base. The aforementioned structure of the antenna 100, 120 allows the tilting of the antenna beam to achieve an effective angle range of between 0 degrees to 90 degrees. Optionally, an effective tilting angle is defined as an angle in which the gain of the main lobe of the antenna beam remains within a range of less than 2 decibels degradation. For clarity, gain is expressed in decibels of gain of the vehicle mounted antenna 100, 120 referenced to the zero dB gain of a free-space isotropic radiator (dBi). For example, when the antenna gain as a function of a tilting angle in a range of 50 degrees, the gain degradation at center of the main lobe is no more than 1.90 dB. Optionally, the tilting angle is centered on an angle of 45 degrees in relation to the base of the antenna 100, 120.

The above described transmission and/or receiving unit is positioned behind the main reflector 101, for example as shown at 454. In such a manner, the space between the sub-reflector 102 and the main reflector 101 does not contain any component or a sub-component of the transmission and/or receiving unit 454. In such a manner, the efficiency of transmitting and receiving communication signals is increased.

Optionally, the main reflector 101 is connected to one or more supporting elements that allow the tilting thereof around a tilting axis that is parallel to the rotational base. In such a manner, the rotational base may be used for simultaneously rotating the reflectors 101, 102, the waveguides 103, and optionally the transmission and/or receiving unit and the supporting elements may be used for tilting only the main reflector 101 in relation to the rotational base, for example as described in International Patent Application Pub. No. WO2008/114246, published on Sep. 25, 2008. Optionally, the rotational base 106 is designed in a manner that allows continues rotation. In such a manner, the rotational base 106 may adjust the rotational angle of the reflectors 101, 102, the waveguide 107, and the transmission and/or receiving unit by a simple rotation operation.

FIG. 2C-2E are schematic illustrations of the exemplary transmission and/or reception arrangement depicted in FIG. 1A from different points of view, according to some embodiments of the present invention. These figures further depict an exemplary receiver 131 connected to a rear summing element 156. A lateral splitting element 157 is placed to connect the OMTs 115 to a transmitter.

FIG. 2F-2H are schematic illustrations of the exemplary transmission and/or reception arrangement depicted in FIG. 1B from different points of view, according to some embodiments of the present invention. In this exemplary arrangement a rear splitting element 166 is placed to split signals from a transmitter. A lateral summarizing element 167 is optionally mounted on a receiver 170 that is connected to a flange 125. The summarizing element 167 is electronically connected, via flexible cables (not shown), to the receiver and to conducting elements 168, 169. Optionally, the conducting elements 168, 169 include cable connectors. The conducting elements 168,169 are electronically connected to the OMTs 115. In such a manner, reception signals from the OMTs 115 are conducted via the summarizing element 167 to the receiver 170. The flexible cables are set to allow rotating each one of the OMTs 115 by the above described polarization motor drive (not shown). The polarization motor drive optionally synchronizes the rotation of the OMTs 115, for instance by coordinated mechanical arms. Optionally, when two rotating OMT/polarizer assemblies 115 are used, the polarization motor drive (not shown) rotates them together, for instance 180° to one another to facilitate the sum of the signals in each channel.

Figure 5A:
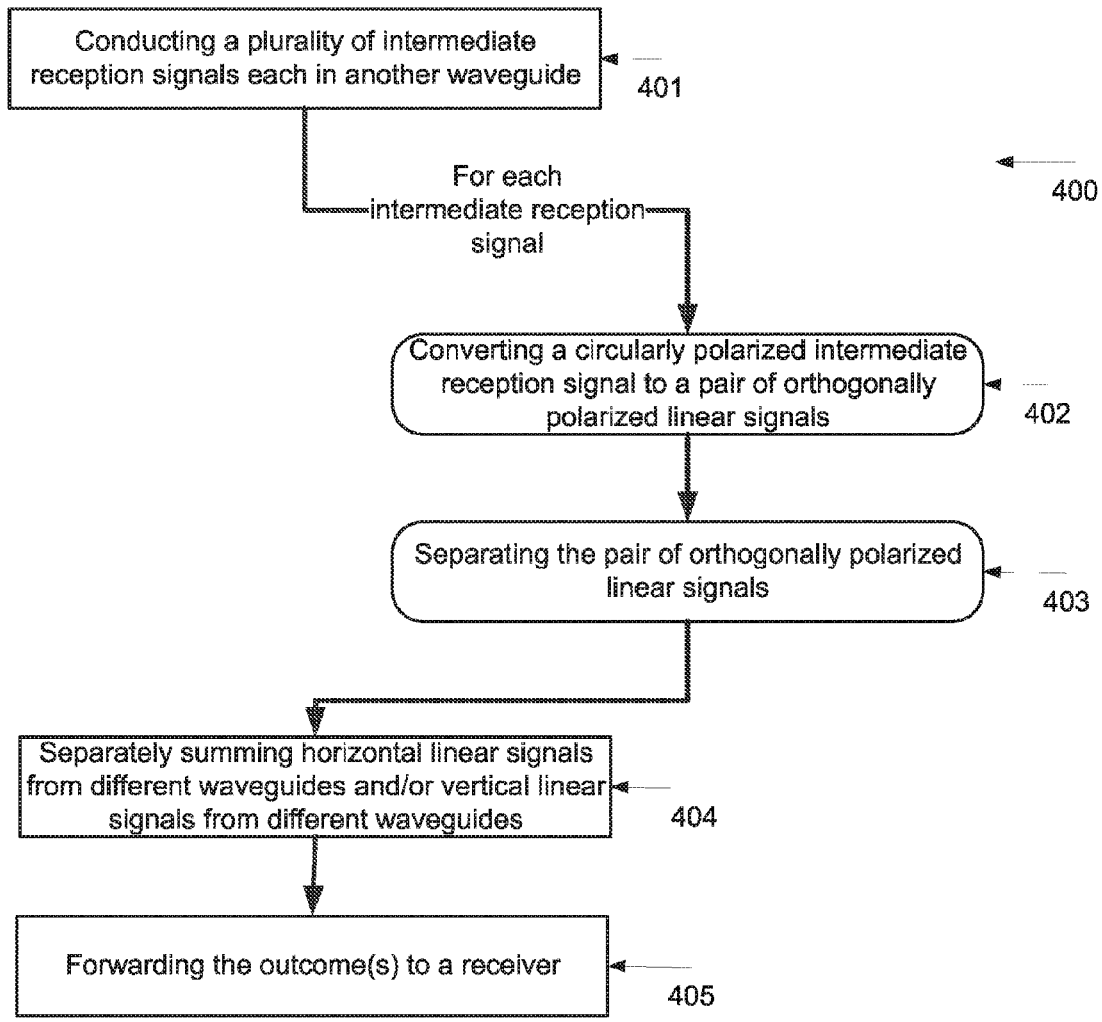
FIG. 5A is a flowchart of a method for receiving a reception communication signal by combining a plurality of intermediate reception signals which are separately conducted via different waveguides in a circular polarization, according to some embodiments of the present invention.
Figure 5B:
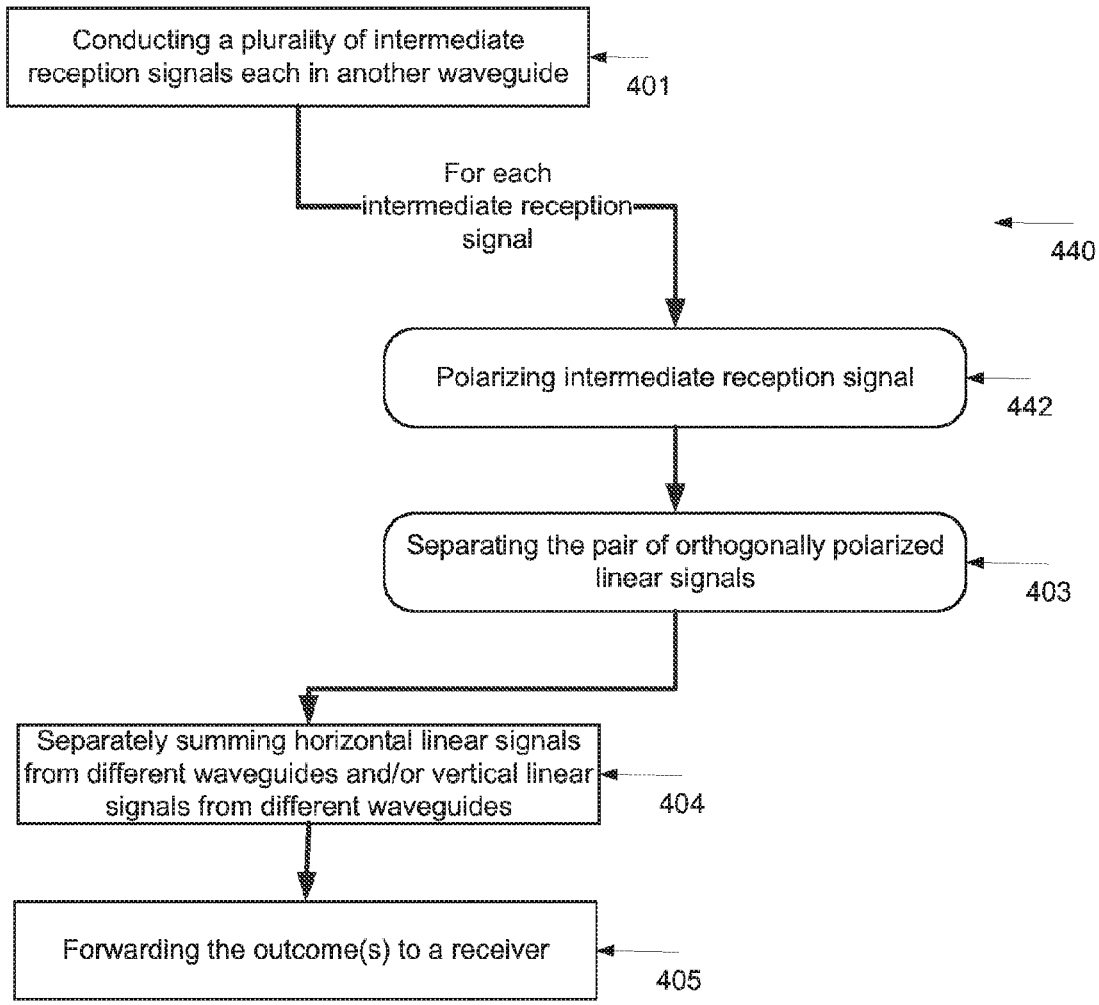
FIG. 5B is a flowchart of a method for receiving a reception communication signal by combining a plurality of intermediate reception signals which are separately conducted via different waveguides in a linear polarization, according to some embodiments of the present invention.

Reference is now also made to FIGS. 5A and 5B, which are flowcharts 400, 440 of methods for receiving a reception communication signal by combining a plurality of intermediate reception signals which are separately conducted via different waveguides, such as 103, in a circular and linear polarization respectively, according to some embodiments of the present invention. The method 400 may be implemented using antenna 100, optionally as described above with reference to FIGS. 1A, 2A, 2B, 2C-2E, 3 and 4. The method 440 may be implemented using antenna 120, optionally as described above with reference to FIGS. 1B and 2F-2H.

In method 400, first, as shown at 401, a reception communication signal which impinges the main reflector 101 and redirected toward the sub reflector 102 is conducted via the common feed horn 111 as a plurality of separate intermediate reception signals. Each intermediate reception signal is separately conducted via a different waveguide. Second, as shown at 402, the polarization of each separate intermediate reception signal is separately converted from circular to linear, for example using a different linear to circular polarization element 114. In 402, each linear to circular polarization element receives as an input from another waveguide 103 an intermediate reception signal with circular polarization and outputs to one of the OMTs 115 a linear signal or a pair of orthogonally polarized linear signals. As shown at 403, each pair of orthogonally polarized linear signals is separated by the OMT to signals which are aligned parallel to each other, for example to vertical and horizontally polarized signals. For example, this allows summing vertically polarized signals separately from horizontally polarized signals and/or vice versa, combining signals which are aligned parallel to each other with the same linear polarization.

Now, as shown at 404, the horizontally polarized signals from all the OMTs 115 and the vertically polarized signals from all the OMTs 115 are separately summed by different summing/splitting elements 116. In such a manner, horizontally polarized signals are summed with horizontally polarized signals and vertically polarized signals are summed with vertically polarized signals.

This allows, as shown at 405, to forward the outcome(s) of summing the vertically polarized signals and/or the summing the horizontally polarized signals to a receiver, for example a low noise block-down converter (LNB).

In method 440, 401 and 403-405 are performed in the same manner; however, instead of the polarization conversion described with reference to 402, as shown at 442, each separate intermediate reception signal is separately polarized without conversion, for example using the OMT 115. Polarization may be adapted by rotating the OMT 115, for instance using a mechanical arm and/or actuator.

Figure 6A:
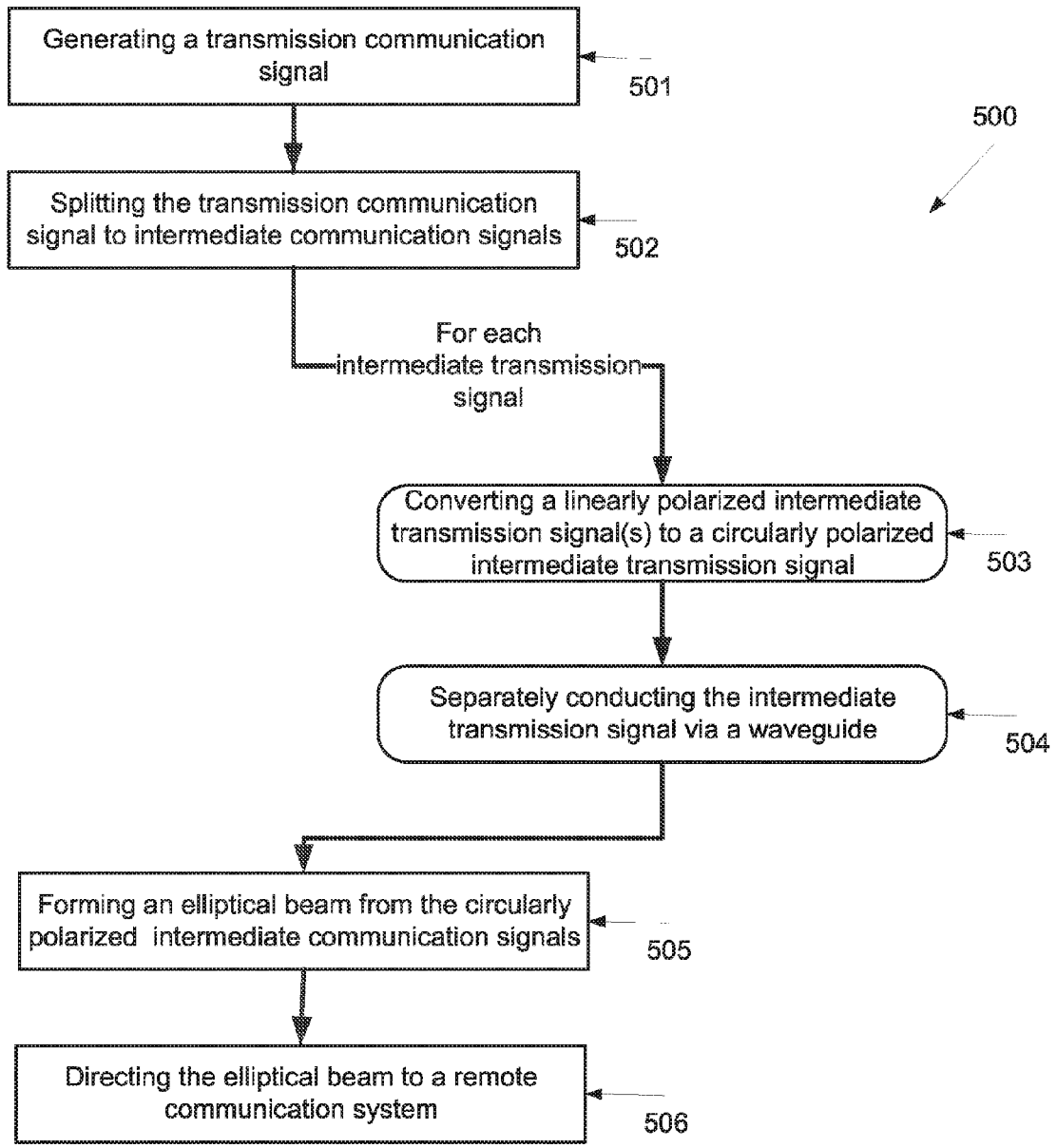
FIG. 6A is a flowchart of a method for transmitting a transmission communication signal by splitting a transmission communication signal to a plurality of intermediate transmission signals which are separately conducted via different waveguides in a circular polarization, according to some embodiments of the present invention.
Figure 6B:
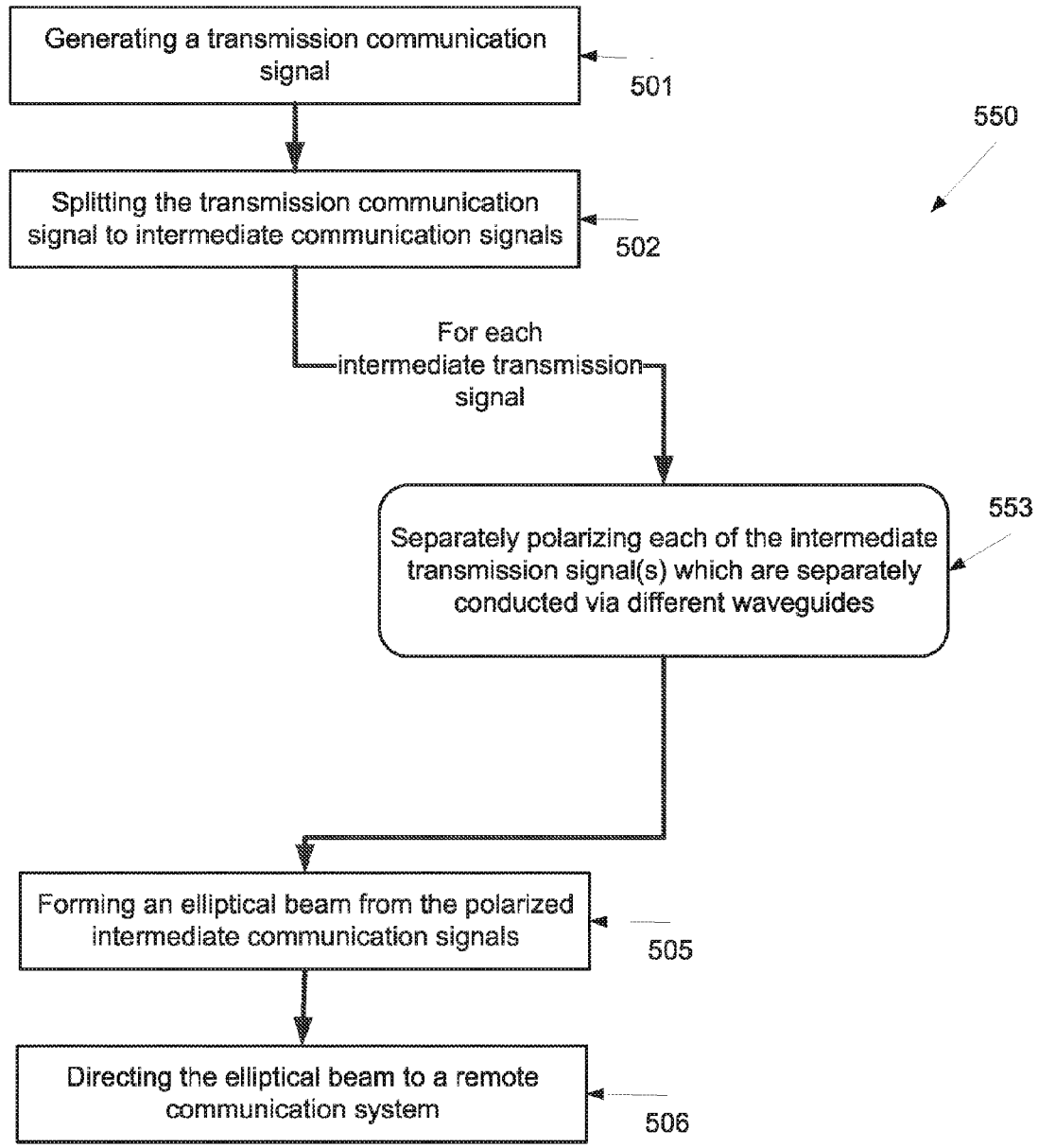
FIG. 6B is a flowchart of a method for transmitting a transmission communication signal by splitting a transmission communication signal to a plurality of intermediate transmission signals which are separately conducted via different waveguides in a linear polarization, according to some embodiments of the present invention.

Reference is now also made to FIGS. 6A and 6B, which are flowcharts 500, 550 of methods for transmitting a transmission communication signal, for example in parallel to receiving a reception communication signal as described above, by splitting a transmission communication signal to a plurality of intermediate transmission signals which are separately conducted via different waveguides, according to some embodiments of the present invention. The method 500 may be implemented using antenna 100, optionally as described above with reference to FIGS. 1A, 2A, 2B, 2C-2E, 3 and 4. The method 550 may be implemented using antenna 120, optionally as described above with reference to FIGS. 1B and 2F-2H.

In method 500, first, as shown at 501, a transmission communication signal is generated by the transmission and/or receiving unit. The transmission communication signal is optionally forwarded to a block up converter (BUC) that converts a transmit signal into a higher frequency, for example a Ka-Band signal that is amplified before it is directed and reflected off the antenna 100 towards a remote communication system. Now, as shown at 502, the transmission communication signal is optionally split to a plurality of intermediate communication signals in a linear polarization. For example each intermediate communication signal is conducted to another OMT from a summing/splitting element. Optionally, as shown at 503, the polarization of each intermediate communication signal is converted from linear to circular, for example by a different linear to circular polarization element 114, for instance after passing via a different OMT 115. As shown at 504, the circularly polarized intermediate communication signals are simultaneously forwarded, each via another waveguide, to the beam shaping element 111. The above conversion has low conversion losses. For example, a received signal has a conversion loss of less than 1.2 db after passing via the beam shaping element, the waveguide, the OMT and the splitting element. The low conversion loss remains relatively low as the signal is conducted in waveguides and not converted pass on line, such as a strip line or a micro strip). As described above and shown at 505, the common feed horn 111 is sized and shaped to form an elliptical beam from the circularly polarized intermediate communication signals. This allows, as shown at 506, directing the elliptical beam to a remote communication system, for example a satellite.

In method 550, 501 and 502 and 505-506 are performed in the same manner; however, instead of the polarization conversion described with reference to 503-504, as shown at 553, each separate intermediate communication signal is separately polarized without conversion, for example using the OMT 115. Polarization may be adapted by rotating the OMT 115, for instance using a mechanical arm and/or actuator.

The common feed horn 111 generates an elliptical beam with a width-length ratio of at least 2.5:1. The ratio of magnitudes of an axis defined by electric field vectors of the combined circularly or linearly polarized intermediate communication signals is maintained about 1:1. This ratio is also known as an axial ratio. The band width of the transmission communication signal is optionally more than 35%, for example about 40%, about 45%, and about 50% or any intermediate or larger band width.

The methods depicted in FIGS. 5A and 6A are optionally conducted simultaneously using the antenna 100, facilitating bidirectional communication with the remote communication system. These methods and the antenna to transmit circularly polarized transmission communication signals in an elliptical beam and to receive circularly polarized reception communication signals using reflectors with elliptical reception surface.

The methods depicted in FIGS. 5B and 6B are optionally conducted simultaneously using the antenna 120, facilitating bidirectional communication with the remote communication system. These methods and the antenna to transmit linearly polarized transmission communication signals in an elliptical beam and to receive linearly polarized reception communication signals using reflectors with elliptical reception surface.

It is expected that during the life of a patent maturing from this application many relevant systems and methods will be developed and the scope of the term a receiver, a transmitter, a waveguide, and a reflector is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. An antenna for communicating with a remote communication system, comprising:
   main and sub reflectors;
   a beam shaping element facing said sub reflector and having a plurality of feeding points;
   a plurality of ortho-mode transducers (OMTs); and
   a plurality of waveguides each having a proximal end connected to another of said plurality of OMTs and a distal end connected to one of said plurality of feeding points;
   wherein said beam shaping element is sized and shaped to form an ellipsoidal beam creating a first elliptical spot on said sub reflector by combining a plurality of polarized intermediate transmission signals; each of said polarized intermediate transmission signals is originated from another of said plurality of OMTs.

2. The antenna of claim 1, further comprising a polarization motor to rotate and synchronically said plurality of OMTs to separately and synchronically polarize each one of said polarized intermediate transmission signals.

3. The antenna of claim 1, further comprising a plurality of linear to circular polarizing elements each separately connected to one of said plurality of OMTs; each said polarized intermediate transmission signal being conducted via another of said plurality of waveguides and having a polarization converted by another of said plurality of linear to circular polarizing elements.

4. The antenna of claim 3, wherein said plurality of polarized intermediate transmission signals have a common circular polarization and a common phase.

5. The antenna of claim 1, wherein said beam shaping element comprises a common feed horn.

6. The antenna of claim 1, wherein said beam shaping element comprises a plurality of spate feed horns.

7. The antenna of claim 1, wherein a ratio of magnitudes of an axis defined by electric field vectors of said ellipsoidal beam and said polarized intermediate transmission signals is about 1:1.

8. The antenna of claim 1, wherein said beam shaping element having a beam shaping portion with a wavy contour that encircles said plurality of feeding points.

9. The antenna of claim 8, wherein said wavy contour is circular and continuous.

10. The antenna of claim 1, wherein said antenna is a vehicle mounted antenna.

11. The antenna of claim 1, wherein said ellipsoidal beam having a width length ratio of at least 2.5:1.

12. The antenna of claim 1, further comprising a transmitter which generates radiation energy from which said plurality of polarized intermediate transmission signals are originated, said transmitter is located behind said main reflector.

13. The antenna of claim 1, wherein said plurality of waveguides are mounted to traverse said main reflector in a niche located in a lower portion of said main reflector.

14. The antenna of claim 1, wherein said plurality of waveguides are mounted one on top of on another above a common axis which is perpendicular to said main reflector.

15. The antenna of claim 1, further comprising a splitting element which receives a base signal generated by a transmitter and outputs said plurality of signals to said plurality of OMTs.

16. The antenna of claim 1, further comprising a combining element having an output which is connected to a receiver and a plurality of inputs each separately connected to another of said plurality of OMTs.

17. The antenna of claim 16, wherein said combining element receives a plurality of intermediate reception signals from said plurality of OMTs, combines them to a single reception communication signal, and forward said single reception signal to said receiver.

18. The antenna of claim 1, further comprising a splitting element having an input which is connected to a transmitter and a plurality of outputs each separately connected to another of said plurality of OMTs.

19. The antenna of claim 1, wherein at least one of said plurality of waveguides having a bended passage with a bended angle of at least 5 degrees in relation to a central axis of a respective said waveguide.

20. The antenna of claim 1, wherein said beam shaping element comprises a plurality of partly conical structures having a common base that forms a common contour.

21. A method of transmitting a signal to a remote communication system as an ellipsoidal beam, comprising:
   splitting a transmission energy to a plurality of transmission signals;
   separately polarizing each of said plurality of transmission signals;
   separately conducting each of said plurality of polarized transmission signals in one of a plurality of waveguides;
   combining said plurality of polarized transmission signals so as to generate an ellipsoidal beam; and
   directing said ellipsoidal beam as an ellipsoidal antenna beam toward the remote communication system.

22. The method of claim 21, wherein said separately polarizing comprises separately converting a linear polarization of each said transmission signal to a circular polarization such that said plurality of polarized transmission signals are a plurality of circularly polarized transmission signals.

23. The method of claim 21, wherein a first ratio axial ratio defined by first electric field vectors of said ellipsoidal beam and a second ratio axial defined by second electric field vectors of said plurality of polarized intermediate transmission signals is about 1:1.

24. The method of claim 21, wherein said combining is performed by a common feed horn to which said plurality of waveguides are mechanically connected.

25. The method of claim 21, wherein said directing comprises radiating a first elliptical spot on a sub reflector and redirecting said ellipsoidal beam toward a main reflector so as to create a second elliptical spot on said main reflector.

26. The method of claim 25, wherein said first elliptical spot having a width-height ratio of at least 2.5:1.

27. The method of claim 25, wherein said second elliptical spot having a width-height ratio of at least 3.5:1.

\* \* \* \* \*